United States Patent [19]

Murakami et al.

[11] Patent Number: 5,352,303
[45] Date of Patent: Oct. 4, 1994

[54] ROLLING BEARING

[75] Inventors: Yasuo Murakami; Yasuo Utsumi; Toichi Kondou, all of Kanagawa, Japan

[73] Assignee: NSK Ltd., Tokyo, Japan

[21] Appl. No.: 156,914

[22] Filed: Nov. 24, 1993

[30] Foreign Application Priority Data

Nov. 25, 1992 [JP] Japan .................. 4-314905

[51] Int. Cl.$^5$ .................. C22C 38/18; C22C 29/04
[52] U.S. Cl. .................. 148/318; 148/906; 384/492; 384/625; 384/912
[58] Field of Search .................. 148/318, 906; 384/492, 384/625, 912

[56] References Cited

FOREIGN PATENT DOCUMENTS 2200369 1/1988 United Kingdom .
2235212 7/1990 United Kingdom .
2235698 8/1990 United Kingdom .
2259714 9/1992 United Kingdom .

Primary Examiner—Deborah Yee
Attorney, Agent, or Firm—Sughrue, Mion, Zinn, Macpeak & Seas

[57] ABSTRACT

An object of this invention is to provide a rolling bearing which is increased in rolling fatigue life when used with a lubricant contaminated by foreign matters, and which is improved in wear resistance and in seizure resistance. In a rolling bearing, at least one of the inner race, outer race and rolling elements thereof is made of an alloy steel which contains 0.10 to 1.0 wt of C, 0.50 to 3.0 wt % of Cr, 0.10 to 2.0 wt % of Mo, 0.15 to 1.0 wt % of Si, 0.20 to 1.5 wt % of Mn, and 0.2 to 1.0 wt % of Ni, and which is carbo-nitrided so that the sum (C+N) of the contents of carbon (C) and nitrogen (N) in the surface layer thereof is 1.0 to 2.0%, and the ratio (N/C) of the content of nitrogen (N) to the content of carbon (C) is 0.8 to 2.0.

4 Claims, 3 Drawing Sheets

ROLLING BEARING

BACKGROUND OF THE INVENTION

This invention relates to rolling bearings, and more particularly to rolling bearings long in rolling fatigue life which are effectively used, for instance, in the transmissions or engines of automobiles, agricultural machines, constructing machines or iron and steel machines.

The inner race, outer race and rolling elements of a rolling bearing are made of various alloy steels such as for instance high carbon chromium bearing steel SUJ2. The recent tendency of rolling bearings is to increase loads applied thereto, and to miniaturize them, and accordingly to increase surface pressures given to them. On the other hand, as rotary members are increased in the speed or machines are enclosed in housings, the rolling bearings used in them are increased in operating temperature, and lubricating oil films are not sufficiently formed in the rolling bearings. That is, rolling bearings must operate in severe operating environments.

In the case of rolling bearings used for instance with the transmissions of a variety of machines, they are used with lubricant contaminated by foreign matters such as metal chips, shavings, burrs and/or powder. Those foreign matters in the lubricant damage the inner race, outer races and rolling elements, thus greatly shorten the rolling fatigue life.

In order to solve the above-described problem, the present Applicant has proposed a rolling bearing in which at least one of the inner race, outer race, and rolling elements is made of an alloy steel which contains: at least two selected from the group consisting of 0.2 to 1.7 wt % of Mn, 0.2 to 1.2 wt % of Si, 0.2 to 1.7 wt % of Cr, 0.1 to 0.3 wt % of Mo, and 0.1 to 1.0 wt % of Ni; 0.4 to 0.7 wt % of C; and the remaining wt % of Fe, and is carbo-nitrided so that the sum of the amount of carburizing and the amount of nitriding of the surface portion thereof is 0.35 to 0.6 wt %, and that the sum of the amount of solid-solution carbon and the amount of solid-solution nitrogen of the surface portion thereof is 0.75 to 1.1 wt %, and the hardness of the core portion thereof is $H_R C$ 57 to 64, and the difference in hardness between the surface portion and the core portion is within $\pm H_R C$ 5 (cf. Japanese Patent Application (OPI) No. 303222/1988 (the term "OPI" as used herein means an "unexamined application").

The rolling bearing thus proposed still has room for improvement in the lengthening of its rolling fatigue life when it is used with a lubricant contaminated by foreign matters. In forming the rolling bearing, its wear resistance or seizure resistance is not particularly taken into account.

SUMMARY OF THE INVENTION

Accordingly, an object of this invention is to provide a rolling bearing which is sufficiently long in rolling fatigue life when used with a lubricant contaminated by foreign matters, and which is improved in wear resistance and in seizure resistance.

The foregoing problem has been solved by the provision of a rolling bearing comprising an inner race, an outer race, and rolling elements, in which at least one of the inner race, outer race and rolling elements thereof is made of an alloy steel which includes
0.10 to 1.0 wt % of C, 0.50 to 3.0 wt % of Cr, 0.10 to 2.0 wt % of Mo, 0.15 to 1.0 wt % of Si, 0.20 to 1.5 wt % of Mn, and 0.2 to 1.0 wt % of Ni, and the at least one of the inner race, outer race and rolling elements thereof is carbo-nitrided so that the sum (C+N) of the contents of carbon (C) and nitrogen (N) in the surface layer thereof is 1.0 to 2.0 wt %, and the ratio (N/C) of the content of nitrogen (N) to the content of carbon (C) is 0.8 to 2.0.

The term "surface layer" as used herein is intended to mean a surface layer the depth of which is up to 2% of the diameter of the rolling element. The aforementioned alloy steel may contain, in addition to the above-described components, impurities such as O, S and Ti within content percentages allowable with the bearing steel.

As was described above, in at least one of the inner race, outer race and rolling elements of the rolling bearing, the sum (C+N) of the contents of carbon (C) and nitrogen (N) in the surface layer thereof is 1.0 to 2.0 wt %, and the ratio (N/C) of the content of nitrogen (N) to the content of carbon (C) is 0.8 to 2.0. Therefore, in addition to carbide, large quantities of carbon nitride and chromium-nitride which are finer than carbide can be dispersed in the surface layer. As a result, the rolling bearing is improved not only in rolling fatigue life but also in wear resistance, in seizure resistance, and in tempering resistance.

BRIEF DESCRIPTION OF THE DRAWING(S)

DETAILED DESCRIPTION OF THE PREFERRED EMBODIMENTS

Figure 1:
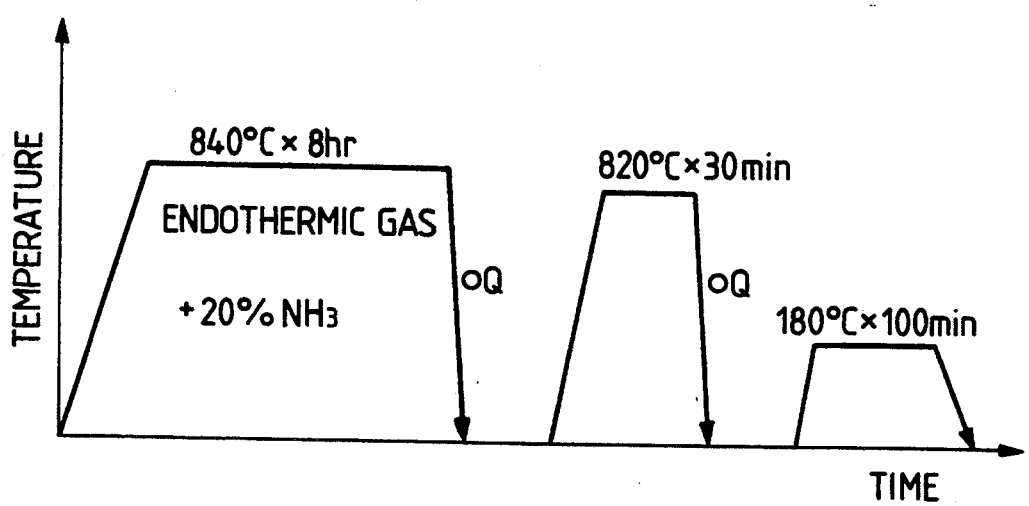
FIG. 1 is a graphical representation indicating a carbo-nitriding and heat-treating cycle employed in formation of concrete examples of a rolling bearing according to this invention.

As was described above, the sum (C+N) is in a range of 1.0 to 2.0. This is to make the matrix sufficiently high in strength by securing predetermined quantities of C and N while large quantities of carbide, carbon nitride and chromium nitride are being dispersed in the surface layer. In the case where (C+N) is smaller than 1.0 wt %, carbide, carbon nitride and chromium nitride are not sufficiently dispersed in the surface layer, and the matrix is insufficient in strength. When (C+N) is larger than 2.0 wt %, macro-carbides are formed in the surface layer, stresses are concentrated at the boundaries between the matrix and the macro-carbides, which shortens the rolling fatigue life.

In the case where (N/C) is smaller than 0.8 even if (C+N) is in a range of 1.0 to 2.0 wt %, then macro-carbides are formed in the surface layer, so that the rolling fatigue life is shortened in the same way. When (N/C) is larger than 2.0, the amount of retained austenite in the surface layer is excessively large, and the matrix is insufficient in strength.

On the other hand, as was described above, in the rolling bearing of the invention, the alloy steel contains 0.10 to 1.0 wt of C, 0.50 to 3.0 wt % of Cr, 0.10 to 2.0 wt % of Mo, 0.15 to 1.0 wt %, of Si, 0.20 to 1.5 wt % of Mn, and 0.2 to 1.0 wt % of Ni.

The content of C is in a range of 0.10 to 1.0 wt %. This is equal to the content of carbon in a case hardening steel or bearing steel which is used for ordinary bearings. In the case where the content of C is smaller than 0.10 wt %, then the carbo-nitriding treatment takes a relatively long period of time. In the case where the content of C is larger than 1.0 wt %, then macro-carbides are formed in the surface layer.

The content of Cr is in a range of 0.5 to 3.0 wt %. This is to precipitate large quantities of carbide, carbon nitride and chromium nitride in the surface layer, and to decrease the grain size thereof. In the case where the content of CR is smaller than 0.50 wt %, formation of macro-carbides is liable to occur. In the case where the content of Cr is larger than 3.0 wt %, a Cr oxide film is formed on the surface, which obstructs the entrance of carbon and nitrogen; that is, the carbo-nitriding characteristic is lowered.

The content of Mo is in a range of 0.10 to 2.0 wt %. This is to give the alloy steel hardenability and toughness. If the content of Mo is smaller than 0.10 wt %, it is impossible to do so. If it is larger than 2.0 wt %, the carbon nitride is increased in grain size.

The content of Si is set in a range of 0.15 to 1.0 wt %. This is to improve the mechanical properties and heat treatment characteristic. If the content of Si is smaller than 0.15 wt %, then the core part is decreased in toughness. If it is larger than 1.0 wt %, then it becomes difficult for carbon and nitrogen to enter the surface; that is, the carbo-nitriding characteristic is lowered.

The content of Mn is set in a range of 0.20 to 1.5 wt %, to improve the hardenability and to give the material toughness. When the content of Mn is small than 0.20 wt %, it is impossible to do so. When it is larger than 1.5 wt %, then the steel is lowered in machinability and in hot working characteristic.

The content of Ni is set in a range of 0.20 to 1.0 wt %, to homogenize the hardened structure thereby to improve the shock resistance. If the content of Ni is smaller than 0.20 wt %, it is impossible to do so. It is not economical to make the content of Ni larger than 1.0 wt %. It is economical to use C, Si, Mn or Cr instead of Ni.

CONCRETE EXAMPLES

As conducive to a full understanding of the invention, concrete examples of the rolling bearing according to the invention, and comparison examples will be described.

An alloy steel having a composition as shown in the following Table 1 was subjected to carbo-nitriding, and then to heat treatment according to a treatment cycle as shown in FIG. 1:

TABLE 1

| C | Cr | Mo | Si | Mn | Ni | P | S |
|---|---|---|---|---|---|---|---|
| 0.36 | 1.81 | 1.04 | 0.25 | 0.93 | 0.14 | 0.017 | 0.008 |

That is, the alloy steel was carbo-nitrided at 840° C. for eight (8) hours by using a gas which was obtained by adding 20 vol % of $NH_3$ to an "endothermic gas" (whose gas composition is 0.3 vol % of $CO_2$, 24.0 vol % of CO, 33.4 vol % of $H_2$, 0.4 vol % of $CH_4$, and the remaining vol % of $N_2$). Thereafter, the alloy steel was quenched with oil. The alloy thus treated was held at 820° C. for thirty (30) minutes to increase the hardness. Furthermore, the alloy steel was quenched with oil, and then tempered at 180° C. for 100 minutes. The contents of C and N in the surface layer of the alloy steel thus treated were as indicated in a graphical representation of FIG. 2, in which depths from the surface are plotted on the horizontal axis.

Figure 2:
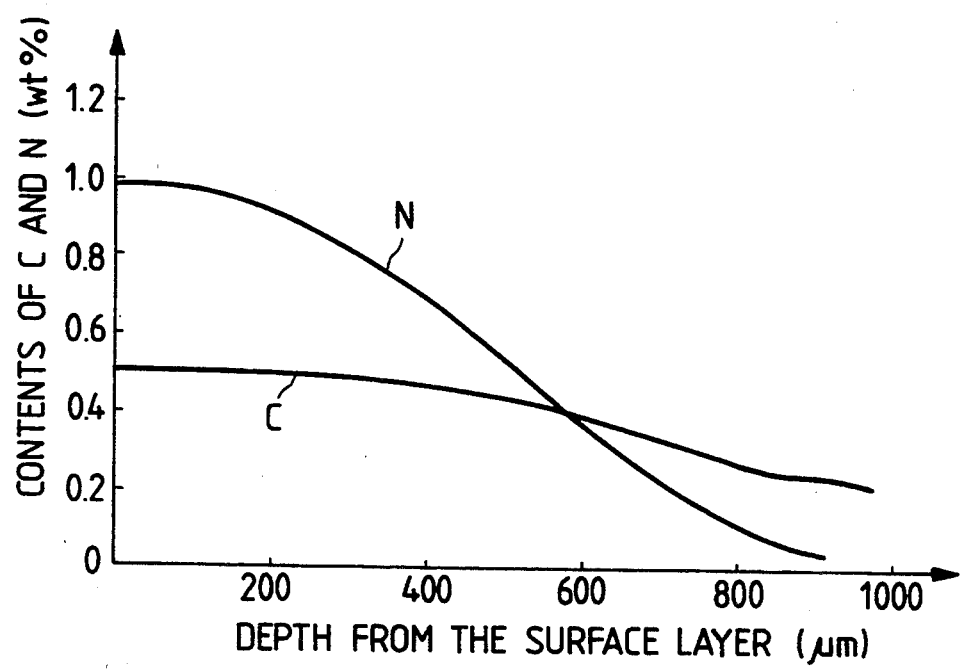
FIG. 2 is a graphical representation indicating relationships between the contents of C and N in the surface layer of an alloy steel of Table 1 which is carbo-nitrided according to the cycle shown in FIG. 1 and depths from the surface.

The alloy steel was carbo-nitrided with reference to the data indicated in FIG. 2, and plate-shaped test pieces were fabricated in which (C+N) and (C/N) at the depth of 0.1 mm are as indicated in the following Table 2:

TABLE 2

| Lot No. | | C + N (wt %) | N/C |
|---|---|---|---|
| Concrete example | No. 1 | 1.91 | 1.93 |
| | No. 2 | 1.04 | 0.90 |
| | No. 3 | 1.65 | 1.10 |
| | No. 4 | 2.00 | 1.22 |
| Comparison example | No. 5 | 1.94 | 2.08 |
| | No. 6 | 1.63 | 0.73 |
| | No. 7 | 2.10 | 1.35 |
| | No. 8 | 0.85 | 1.42 |
| | No. 9 | 0.94 | 0.67 |
| | No. 10 | 2.11 | 2.20 |

The rolling fatigue lives of the test pieces of all of the lots, with the lubricant contaminated by foreign matters, were tested at room temperature (25° C.) and at a temperature of 130° C. with a thrust bearing life tester which has been disclosed by the publication "Special Steel Handbook" 1st edition (edited by Denki Seikou Kenkyusho, published by Rikohgakusha, May 25, 1969) at page 21 of vol. 10. Test condition was as follows.

| At room temperature | |
|---|---|
| Pmax (surface pressure) | 500 kgf/mm$^2$ |
| Speed | 1000 rpm |
| Lubricant | Turbine VG68 |
| At 130° C. | |
| Pmax (surface pressure) | 560 kgf/mm$^2$ |
| Speed | 1000 rpm |
| Lubricant | Turbine VG150 |

Foreign Matters Mixed

Powder of $Fe_3C$ series which was Hv 870 in hardness and 74 to 147 μm in grain size was mixed in the lubricant at a rate of 300 ppm.

Figure 3:
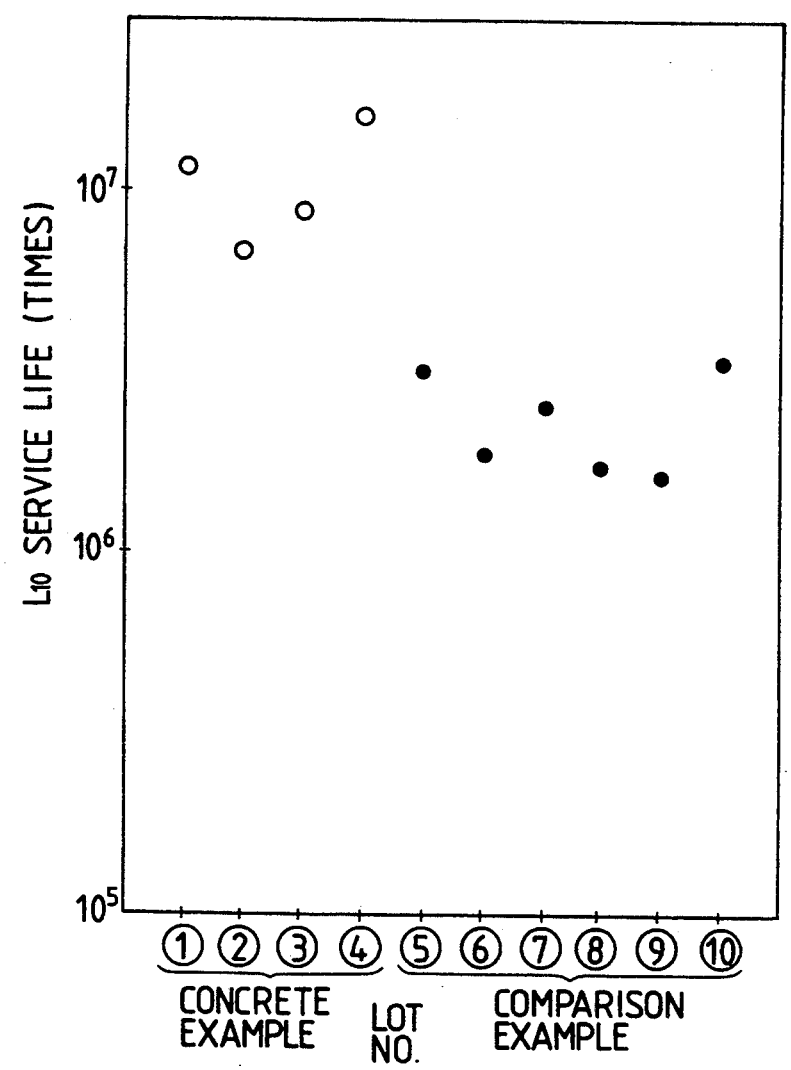
FIG. 3 is a graphical representation for comparison of the $L_{10}$ lives of test pieces of Lot No's 1 through 10 which were tested at room temperature.
Figure 4:
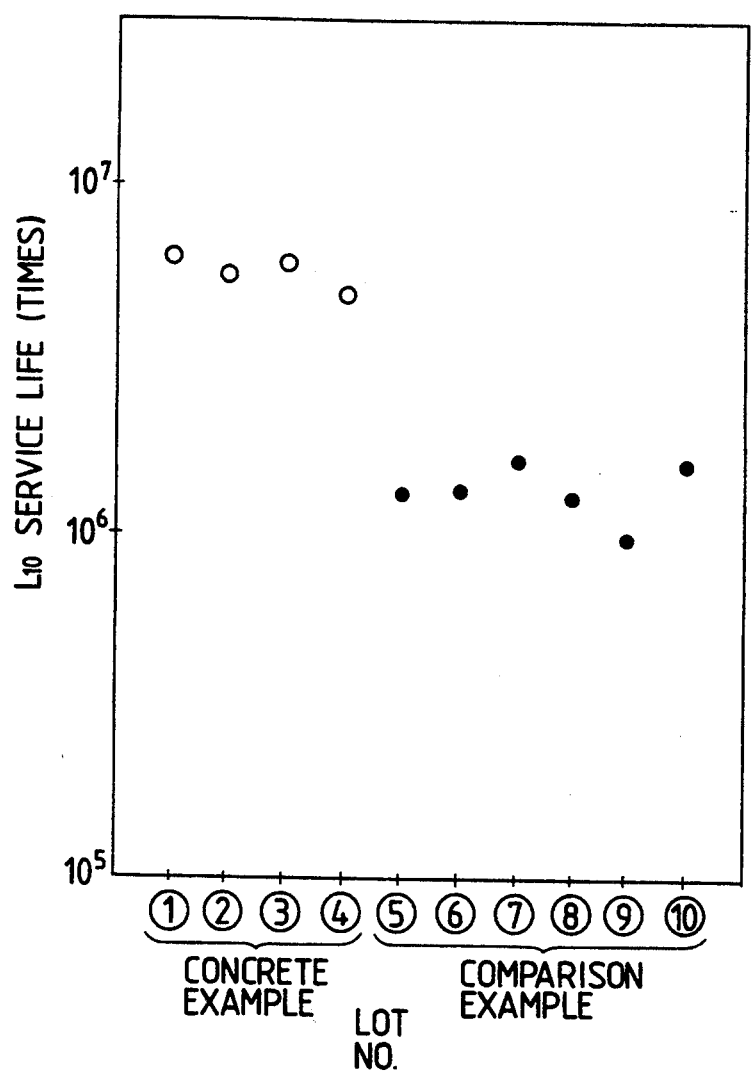
FIG. 4 is a graphical representation for comparison of the $L_{10}$ lives of test pieces of Lot No's 1 through 10 which were tested at a temperature of 130° C.

For every lot, ten test pieces were tested, and a Weibull plot was formed by detecting the number of times of application of stress (service life) until each test piece suffered from flaking, and the Weibull distribution was utilized to obtain the $L_{10}$ life of each. The results of the tests given at room temperature are as shown in FIG. 3, and the results of the tests given at 130° C. are as shown in FIG. 4.

Figure 5:
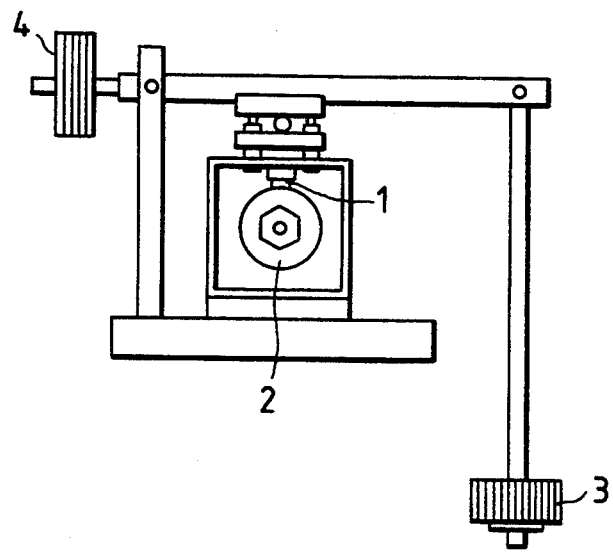
FIG. 5 is an explanatory diagram outlining a SABAN type wear tester which is used for testing the test pieces of Lot No's 1 through 10.

The test pieces of each of the lots were tested for specific wear data and seizure limit with a SAVAN type wear tester as shown in FIG. 5.

Test Conditions

Lubrication: dry (no lubrication)
Load: 3.68 kgf
(Initial surface pressure Pmax: 10 kgf/mm$^{02}$)

That is, a stationary test piece 1 and a rotary test piece 2, which belonged to one and the same lot were set on the tester, and a loading weight 3 and a balancing weight 4 are coupled to the tester. Under this condition, the rotary test piece 2 was rotated at a speed of 1 m/s with respect to the stationary test piece 1. Under this condition, until the cylindrical surface of the rotary test piece 2 rotated 1 km in total distance, the wear volume of the stationary test piece was measured whenever the cylindrical surface of the rotary test piece 2 rotated a predetermined distance, thereby to calculate the specific wear data. As for the seizure limit, the rotary test piece 2 was rotated at friction velocities of 0.5 to 3.5 m/s, and the friction velocity was detected when the wear changed from non-adhesion wear to adhesion wear. The results of test are as indicated in the following Table 3:

TABLE 3

| Lot No. | | Specific wear data (mm$^3$/kgf mm) | Seizure limit (m/s) |
|---|---|---|---|
| Concrete example | No. 1 | 0.21 × 10$^{-7}$ | 3.00 |
| | No. 2 | 0.18 × 10$^{-7}$ | 3.00 |
| | No. 3 | 0.24 × 10$^{-7}$ | 3.50 |
| | No. 4 | 0.26 × 10$^{-7}$ | 3.00 |
| Comparison example | No. 5 | 0.69 × 10$^{-7}$ | 2.20 |
| | No. 6 | 0.75 × 10$^{-7}$ | 1.75 |
| | No. 7 | 0.48 × 10$^{-7}$ | 2.60 |
| | No. 8 | 0.53 × 10$^{-7}$ | 2.20 |
| | No. 9 | 1.03 × 10$^{-7}$ | 1.75 |
| | No. 10 | 0.87 × 10$^{-7}$ | 2.20 |

As is apparent from FIGS. 3 and 4 and Table 3, the test pieces of Lot No's 1 through 4, corresponding to the concrete examples of the rolling bearing according to the invention are superior to the comparison examples (Lot No's 5 through 10) in rolling fatigue life, in wear resistance, and in seizure resistance when used with lubricant contaminated foreign matters at room temperature or at 130° C. That is, the rolling bearings provided by the invention are excellent in rolling fatigue life, in wear resistance, and in seizure resistance when used with lubricant contaminated by foreign matters.

In addition, as is apparent from FIGS. 3 and 4 and Table 3, it is more preferable that the sum (C+N) of the contents of carbon (C) and nitrogen (N) in the surface layer thereof is 1.5 to 2.0 wt %, and the ratio (N/C) of the content of nitrogen (N) to the content of carbon (C) is 1.5 to 2.0.

As was described above, in the rolling bearing of the invention, at least one of the inner race, outer race and rolling elements thereof is made of the alloy steel which contains 0.10 to 1.0 wt of C, 0.50 to 3.0 wt % of Cr, 0.10 to 2.0 wt % of Mo, 0.15 to 1.0 wt % of Si, 0.20 to 1.5 wt % of Mn, and 0.2 to 1.0 wt % of Ni, and is carbo-nitrided so that the sum (C+N) of the contents of carbon (C) and nitrogen (N) in the surface layer thereof is 1.0 to 2.0 wt %, and the ratio (N/C) of the content of nitrogen (N) to the content of carbon (C) is 0.8 to 2.0. Hence, the rolling bearing of the invention is long in rolling fatigue life when used with lubricant contaminated by foreign matters, and is improved in wear resistance, and in seizure resistance.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A rolling bearing comprising an inner race, an outer race, and rolling elements, in which
    at least one of the inner race, outer race and rolling elements thereof is made of an alloy steel which contains 0.10 to 1.0 wt % of C and 0.50 to 3.0 wt % of Cr; and
    said at least one of the inner race, outer race and rolling elements is carbo-nitrided so that the sum (C+N) of the contents of carbon (C) and nitrogen (N) in the surface layer thereof is 1.0 to 2.0 wt %, and the ratio (N/C) of the content of nitrogen (N) to the content of carbon (C) is 0.8 to 2.0.

2. A rolling bearing according to claim 1, in which said alloy steel further contains 0.10 to 2.0 wt % of Mo, 0.15 to 1.0 wt % of Si, 0.20 to 1.5 wt % of Mn, and 0.2 to 1.0 wt % of Ni.

3. A rolling bearing according to claim 1, in which the sum (C+N) of the contents of carbon (C) and nitrogen (N) in the surface layer thereof is 1.5 to 2.0 wt %, and the ratio (N/C) of the content of nitrogen (N) to the content of carbon (C) is 1.5 to 2.0.

4. A rolling bearing according to claim 2, in which the sum (C+N) of the contents of carbon (C) and nitrogen (N) in the surface layer thereof is 1.5 to 2.0 wt %, and the ratio (N/C) of the content of nitrogen (N) to the content of carbon (C) is 1.5 to 2.0.

* * * * *